Dec. 5, 1967  D. A. BETZ  3,355,828
MOUNT FOR PHOTOGRAPHS OR THE LIKE
Filed Feb. 28, 1966

United States Patent Office 3,355,828
Patented Dec. 5, 1967

3,355,828
MOUNT FOR PHOTOGRAPHS OR THE LIKE
Donald A. Betz, Pittsford, N.Y. (15 Bretton Woods Drive, Rochester, N.Y. 14618)
Filed Feb. 28, 1966, Ser. No. 530,610
9 Claims. (Cl. 40—152.1)

ABSTRACT OF THE DISCLOSURE

A mount for photographs or the like is provided by a single sheet of cardboard or the like, cut, scored, and folded to provide a rear panel and a front panel adapted to receive a photograph between them, the front panel being apertured to show the desired area of the photograph. The rear panel has an easel section which may be swung rearwardly to provide a supporting leg for holding the panels in an upright position when they rest upon a flat surface, and also a strut section which may be bent to form a brace engaging the easel section and holding the easel section at the desired angle to the rear panel. The score line on which the strut section bends is at an angle relative to the strut line on which the easel section bends, such that when these sections are bent out from the plane of the rear panel, the strut section will jam against the easel section and hold it firmly. Part of the rear area of the front panel is coated with adhesive to hold the two panels against each other after the picture has been inserted between them.

---

This invention relates to a mount for photographs or other pictures. An object of the invention is the provision of an easily manufactured, easily used, simple, and inexpensive mount for framing photographs or other pictures and holding them in an upright position.

Another object is the provision of such a mount so designed that if the picture is longer in one dimension than in the other dimension at right angles thereto, either dimension may be horizontal, the other one being upright.

Still another object is the provision of such a mount so designed that it can be easily made from a single piece of simple and inexpensive sheet material such as stiff paper or thin cardboard or Bristol board.

These and other desirable objects may be attained in the manner disclosed as an illustrative embodiment of the invention in the following description and in the accompanying drawings forming a part hereof, in which.

Figure 1:
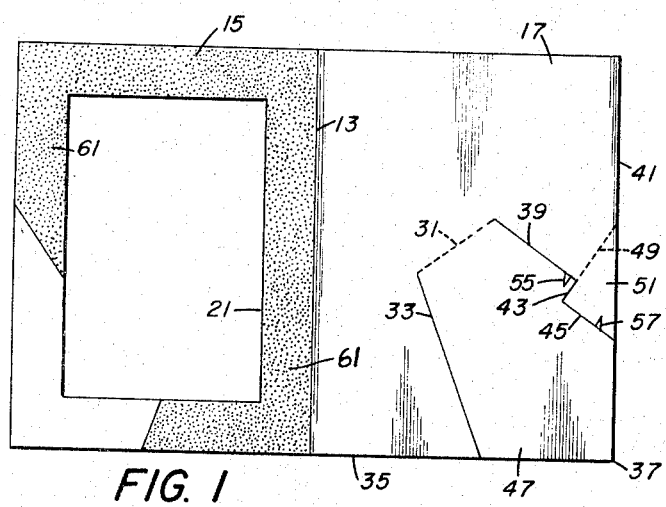
FIG. 1 is a face view of the blank from which a preferred form of the present mount is made, showing what may be termed the inner faces of the two main portions of the blank, that is, the faces which will be folded together when the blank is folded by the user to act as a frame for the picture.
Figure 4:
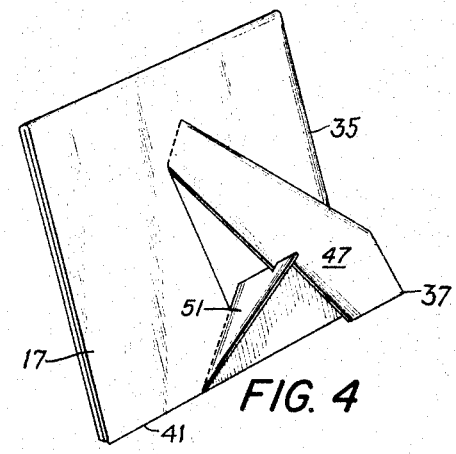
FIG. 4 is a perspective view of the mount looking obliquely at the rear, showing the easel erected so as to enable the mount to remain upright when the mount is placed on a flat surface such as a table or shelf.

Referring first to FIG. 1, the mount is made from a rectangular piece of suitable sheet material such as stiff paper or thin cardboard or Bristol board, scored crosswise midway of its length at 13 to form a hinge line on which the two sections 15 and 17 may be folded relative to each other so that one overlies the other. When they are thus folded, the section 15 forms what may be called the front panel, and the section 17 the rear panel. FIG. 1 shows the rear face of the front panel and the front face of the rear panel, in the original flat condition before the panels are folded on the hinge 13.

The front panel 15 is cut away centrally to form a window 21 to expose the desired area of the photograph or other picture which is to be placed between the two panels. The window is of any desired shape. Ordinarily it will be rectangular, since the picture to be exhibited is ordinarily rectangular. But if the picture is oval, for example, the window 21 may be correspondingly shaped.

The rear panel 17 is scored to form a hinge line 31 which is oblique to the edges of the panel, as shown. The panel is cut or slit, completely through its thickness, along a line 33 extending from one end of the hinge 31 to the edge 35 of the panel at some distance away from the corner 37, and also along a line 39 extending from the opposite end of the hinge 31 toward the adjacent edge 41 of the panel. Unlike the cut 33, the cut 39 does not extend straight to the edge, but terminates at one end of a short slit 43 which is at a right angle to the slit 39. From the other end of the slit 43, a slit 45, parallel to the slit 39, extends to the panel edge 41. Thus the slits or cuts 33, 39, 43, and 45 serve collectively to separate a section 47 from the rest of the rear panel 17, except at the hinge 31. This section 47 constitutes an easel portion or leg portion which may be swung obliquely rearwardly, on the hinge 31, to form a support to hold the picture mount in an upright position, tilted slightly rearwardly, when the mount is set on a level surface such as a table or shelf.

A locking flange is also formed from the material of the back panel 17. This is done by providing a score line 49 as a straight continuation of the cut or slit 43, running from this cut to the adjacent edge 41 of the panel. The material included within the score 49, the cuts 43 and 45, and the edge 41 thus forms a flange 51 which may be swung rearwardly on the score line 47 as a hinge, and which may be jammed tight against the side edge of the leg 47 after the leg has been swung rearwardly to the desired angular position, to act as a strut to hold the leg in its erected or effective position. It may be noted that the included angle between the hinge line 31 and the cut 39 is slightly more than 90 degrees, so that as the leg 47 swings away from the plane of the panel 17, the edges formed by the cuts 39 and 45 will swing closer to the upstanding edge of the strut 51 if the latter has been swung out to its effective position, and will jam against it. In some cases, the mere tight frictional jamming of the leg and the strut against each other may be sufficient to hold both of them in their effective positions. It is preferred, however, to provide special means for securely interlocking the leg and the strut with each other, to insure against accidental disengagement and collapse.

This is accomplished by forming a small notch 55 in the edge of the leg 47 which is formed by the cut 39, and a similar small notch 57 in the edge of the strut 51 which is formed by the cut 45. When the leg or easel 47 is swung rearwardly to its erected or effective supporting position, and when the strut is swung rearwardly to its effective locking position, the parts are placed so that the bottom of the small notch 57 is seated in the bottom of the notch 55, thus effectively locking the parts to each other. To do this, the strut 51 is somewhat bent or deformed by pressure of the fingers of the user, the sheet material being sufficiently resilient to straighten out again after it has been deformed to engage the notches with each other. Because of the offset between the cut 39 and the cut 45, the edge of the strut 51 "overlaps" the edge of the easel portion 47, requiring somewhat more deformation of the strut, to engage the notches, than would be the case if the cuts 39 and 45 were in a straight line, but this increases the locking force and reduces the possibility of accidental unlocking.

A suitable portion of either the rear face of the front panel 15 or the front face of the rear panel 17 (these being the faces shown in FIG. 1) is coated with adhesive, to hold the two panel sections in closed cooperative relation to each other when they have been folded upon each other, and to hold the photograph or other picture in proper position between them. Preferably the adhesive is on the rear face of the front panel, and covers the entire margin or border from the window 21 to the outer edges of the front panel, except those portions which will underlie the easel 47 and strut 51 when the rear panel is folded down onto the back of the front panel. The adhesive is indicated by the stippling 61 in FIG. 1. It may be either a dry adhesive becoming sticky when moistened, or a heat sensitive adhesive activated by moderate heat such as a flat iron, or preferably a pressure sensitive adhesive originally protected by an overlying layer of paper which is peeled off in conventional manner just before the picture is placed in position and the front and back panels are folded to closed relation to each other.

Figure 2:
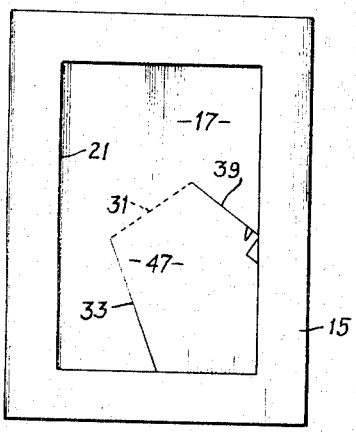
FIG. 2 is a front view of the completed mount (but without any picture therein) stood up so that the short axis is horizontal and the long axis is upright.
Figure 3:
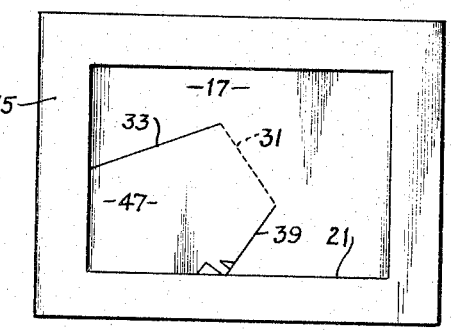
FIG. 3 is a similar view with the mount turned so that the long axis is horizontal and the short axis is upright.

In use, the mount is laid out flat in the position illustrated in FIG. 1, with the hidden face down on a flat surface and with the illustrated face uppermost in the position shown. The picture (not illustrated) is laid face down on the left hand panel 15, properly centered with respect to the window 21. The picture is ordinarily a little larger than the window 21, so that the edges of the picture overlap the adhesive area 61 and are retained thereby, but do not extend all the way to the edges of the panel and thus do not cover all of the adhesive. The right hand panel 17 is now swung up, on the hinge line 13, and over onto the back of the panel 15 and the picture which has already been placed thereon, and is retained in this position by that part of the adhesive 61 which is not already covered by the edges of the picture. The easel portion or leg portion 47 is then swung up on the hinge 31, and the strut portion 51 is swung up on the hinge 49 and is deformed enough to interlock the notch 57 with the notch 55, thereby locking the leg 47 at an inclination to the rest of the panel 17 (and the panel 15) to form an easel for supporting the frame or mount in an upstanding position with a slight rearward tilt. Depending upon the requirements of the picture which is being mounted or framed, the mount may be stood up with either its long axis upright, as in FIG. 2, or with its short axis upright, as in FIG. 3, since the lower end of the leg 47 has two edges at a right angle to each other, and can serve equally well for holding the mount upright in either of the two positions.

The mount may be manufactured very easily, quickly, simply, and inexpensively, since it is merely blanked out from a single layer of sheet material by a die-cutting operation, using conventional machinery such as a die-cutting press. Then adhesive is applied to the desired area, and this completes the manufacturing operation. The article is now ready for packing and shipping to a dealer or to an ultimate consumer, who receives it in the flat condition shown in FIG. 1. It requires but a moment to mount a photograph or other picture of suitable size, and to erect the easel and strut parts, ready to hold the article in the desired upright position. When the brief mounting operation is completed, the user has a picture which is attractively framed and which will stand upright in whichever of two positions of orientation is desired.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A mount for a photograph or the like, comprising sheet material providing
   (a) a front panel centrally apertured to provide a window through which a photograph or the like placed behind said front panel may be seen, and
   (b) a rear panel behind said front panel and photograph,
   (c) said rear panel being cut and scored to provide
      (i) an easel leg section connected to the rest of said rear panel by a hinge score line located inwardly from the edges of said rear panel and extending obliquely with respect to such edges, said leg section extending from said score line to one corner of the panel, and
      (ii) a strut section connected to the rest of said rear panel by a hinge score line and having an edge adapted to be engaged with an edge of said leg section when both sections are swung on their respective score lines to project outwardly from the rest of said rear panel, so as to hold said leg section in a projecting position where it may constitute an inclined easel leg for holding said front panel and the rest of said rear panel in an upstanding position,
   (d) the hinge score line of said leg section being at a slight angle to the hinge score line of said strut section, such that as said leg section swings rearwardly from the plane of the rest of said rear panel, an edge of said leg section swings to a position over the original undisplaced position of said strut section.

2. A construction as defined in claim 1, wherein a part of one edge of said leg section and one edge of said strut section are formed by a single cut in said rear panel.

3. A construction as defined in claim 1, wherein one edge of said leg section has a notch for receiving an edge of said strut section when both sections are swung to their normal erected positions.

4. A construction as defined in claim 1, wherein one edge of said strut section has a notch for receiving an edge of said leg section when both sections are swung to their normal erected positions.

5. A construction as defined in claim 1, wherein one edge of said easel leg section is formed by a cut in said rear panel extending in a first direction from one end of said hinge score line of said leg section to one end of said hinge score line of said strut section, thence in a second direction constituting a continuation of the direction of said hinge score line of said strut section, thence in a third direction at approximately a right angle to said second direction, to an outer edge of said rear panel.

6. A construction as defined in claim 5, wherein said cut in said third direction also forms one edge of said strut section.

7. A construction as defined in claim 6, wherein there is a notch in the edge of said leg section formed by said cut in said first direction and a notch in the edge of said strut section formed by said cut in said third direction, the two notches being adapted to interlock with each other when the two sections are in normal erected position.

8. A construction as defined in claim 7, wherein said front panel and said back panel are both formed from the same piece of sheet material and are integrally connected to each other along a hinge score line.

9. A construction as defined in claim 8, wherein a portion of the face of one of said panels which will be faced toward the other of said panels, when the panels are in picture-holding assembled relation to each other, is provided with a coating of adhesive.

References Cited

UNITED STATES PATENTS

| 547,377 | 10/1895 | Gillbee | 40—152.1 |
| 2,816,382 | 12/1957 | Spertus | 40—152.1 |

FOREIGN PATENTS

| 643,869 | 5/1928 | France. |

EUGENE R. CAPOZIO, *Primary Examiner.*
W. J. CONTRERAS, *Examiner.*